US012562566B2

(12) United States Patent
Hao et al.

(10) Patent No.: US 12,562,566 B2
(45) Date of Patent: Feb. 24, 2026

(54) BLOCKING-TYPE SURGE PROTECTOR HAVING ACCELERATED TURN-OFF

(71) Applicant: WAYON SEMICONDUCTOR CO., LTD., Shanghai (CN)

(72) Inventors: Zhuangzhuang Hao, Shanghai (CN); Deyi Zhao, Shanghai (CN); Qianyuan Jiang, Shanghai (CN); Haiwei Su, Shanghai (CN)

( * ) Notice: Subject to any disclaimer, the term of this patent is extended or adjusted under 35 U.S.C. 154(b) by 172 days.

(21) Appl. No.: 18/556,770

(22) PCT Filed: Aug. 31, 2022

(86) PCT No.: PCT/CN2022/116354
§ 371 (c)(1),
(2) Date: Oct. 23, 2023

(87) PCT Pub. No.: WO2023/155416
PCT Pub. Date: Aug. 24, 2023

(65) Prior Publication Data
US 2024/0136810 A1 Apr. 25, 2024
US 2024/0235186 A9 Jul. 11, 2024

(30) Foreign Application Priority Data
Feb. 18, 2022 (CN) .......................... 202210148643.5

(51) Int. Cl.
*H02H 9/02* (2006.01)

(52) U.S. Cl.
CPC .................................... *H02H 9/025* (2013.01)

(58) Field of Classification Search
CPC .. H02H 3/20; H02H 9/04; H02H 9/02; H02H 9/025; H02H 3/02; H02H 9/00; H02H 3/22
USPC .......................................... 361/56, 91.1, 111
See application file for complete search history.

(56) References Cited

U.S. PATENT DOCUMENTS

| | | | |
|---|---|---|---|
| 6,970,337 B2 * | 11/2005 | Strahm ................... | H02H 9/025 361/58 |
| 8,254,073 B1 * | 8/2012 | Choy ................... | G01S 7/52017 361/91.1 |
| 8,487,667 B2 * | 7/2013 | Iwamura .............. | H03K 17/567 327/108 |
| 2009/0027822 A1 * | 1/2009 | Darwish ................ | H02H 9/025 361/111 |
| 2009/0122456 A1 * | 5/2009 | Morrish .................. | H02H 9/025 361/111 |
| 2009/0231773 A1 * | 9/2009 | Morrish ................. | H02H 9/025 361/111 |

(Continued)

*Primary Examiner* — Danny Nguyen
(74) *Attorney, Agent, or Firm* — Clement Cheng

(57) ABSTRACT

Provided is a blocking-type surge protector for accelerated turn-off, comprising: a first transistor (M1), a drain electrode thereof connected to a first port; a second transistor (M2), a drain electrode thereof connected to a source electrode of the first transistor (M1), and a source electrode thereof connected to a gate electrode of the first transistor (M1), the source electrode thereof being further connected to a second port; a first resistor (R1), connected between the drain electrode of the first transistor (M1) and the gate electrode of the second transistor (M2); and an accelerated turn-off module (10), connected between the drain electrode of the first transistor (M1) and the gate electrode of the second transistor (M2).

9 Claims, 6 Drawing Sheets

(56)         References Cited

U.S. PATENT DOCUMENTS

2012/0280271 A1* 11/2012 Ichikawa .............. H10D 18/00
257/E29.217

* cited by examiner

BLOCKING-TYPE SURGE PROTECTOR HAVING ACCELERATED TURN-OFF

BACKGROUND OF THE INVENTION

1. Field of the Invention

The present invention relates to the field of surge protection technology, and more particularly, to a blocking-type surge protector having accelerated turn-off.

2. Description of the Related Art

In electronic circuits, power surges or transient overvoltages can occur due to lightning strikes, power line coupling, power line induction, or ground bounce. When the surge is sufficiently high, it can cause serious damage to electronic devices such as computers and telephones. Similarly, it can also reduce the lifetime of the equipment.

Currently, for computers and other high-speed data transmission lines, a blocking-type surge protector is chosen to protect the backend load. The blocking-type surge protector is connected in series with the load to provide targeted protection. When it reaches the triggering value, it changes its state, redirecting the surge through primary protection paths such as gas discharge tubes, effectively blocking transient surges from entering the protected equipment.

The construction of the blocking-type surge protector in existing technology is shown in FIG. 1. It consists of the first transistor M1, the second transistor M2, and the first resistor R1. The first transistor M1 is a depletion-type NMOS, and the second transistor M2 is a P-type JFET. The first resistor R1 is usually a polysilicon resistor. The drain electrode of the first transistor M1 is connected to the gate electrode of the second transistor M2 through the first resistor R1, which typically has a resistance value of several hundred kΩs and serves as a current-limiting element during the off state of the blocking-type surge protector. However, at the same time, the first resistor R1 and the parasitic capacitance of the gate electrode of the second transistor M2 connected therewith form a series RC circuit. Due to the relatively large resistance value, the time constant of the series RC circuit is large, resulting in slow charging of the parasitic capacitance of the gate electrode and slow rise of the gate voltage of the second transistor M2. This leads to a slow turn-off speed of the blocking-type surge protector, typically taking about 1 us to fully enter the off state. During this process, surge current can still flow through the blocking-type surge protector to the protected load, posing a safety risk to the load circuit.

SUMMARY OF THE INVENTION

This invention aims to provide a blocking-type surge protector having accelerated turn-off. By means of introducing the accelerated turn-off module into a circuit, the turn-off speed of the blocking-type surge protector is greatly increased and a current flowing to an output end during the turn-off process is reduced, thereby providing finer and excellent surge protection for the post-stage load.

A blocking-type surge protector having accelerated turn-off arranged between a first port and a second port, comprising:

a first transistor, a drain electrode of the first transistor is connected to the first port;

a second transistor, a drain electrode of the second transistor is connected to a source electrode of the first transistor, a source electrode of the second transistor is connected to a gate electrode of the first transistor, and the source electrode of the second transistor is connected to the second port;

a first resistor, connected between the drain electrode of the first transistor and a gate electrode of the second transistor;

an accelerated turn-off module, connected between the drain electrode of the first transistor and the gate electrode of the second transistor;

wherein when a surge occurs, a current flowing through the accelerated turn-off module charges a parasitic capacitance of the gate electrode of the second transistor, such that a gate voltage of the second transistor quickly rises, so as to increase turn-off speed of blocking-type surge protector.

Further, the accelerated turn-off module comprises:

a capacitor, connected between the drain electrode of the first transistor and the gate electrode of the second transistor;

wherein the current of the blocking-type surge protector flows from the first port to the second port.

Further, the accelerated turn-off module comprises:

a first diode, wherein a positive terminal of the first diode is connected to the gate electrode of the second transistor, and a negative terminal of the first diode is connected to the drain electrode of the first transistor;

wherein the current of the blocking-type surge protector flows from the first port to the second port.

Further, the blocking-type surge protector having accelerated turn-off comprises:

a third transistor, wherein a source electrode of the third transistor is connected to the source electrode of the second transistor, a gate electrode of the third transistor is connected to the source electrode of the first transistor, and a drain electrode of the third transistor is connected to the second port;

a second resistor, connected between the gate electrode of the second transistor and the drain electrode of the third transistor;

the accelerated turn-off module comprises a first accelerated turn-off unit and a second accelerated turn-off unit;

the first accelerated turn-off unit comprises:

a first diode, wherein a negative terminal of the first diode is connected to the drain electrode of the first transistor;

a second diode, wherein a positive terminal of the second diode is connected to a positive terminal of the first diode, and a negative terminal of the second diode is connected to the gate electrode of the second transistor;

the second accelerated turn-off unit comprises:

a third diode, wherein a negative terminal of the third diode is connected to the gate electrode of the second transistor;

a fourth diode, wherein a positive terminal of the fourth diode is connected to a positive terminal of the third diode, and a negative terminal of the fourth diode is connected to the drain electrode of the third transistor;

the current of the blocking-type surge protector flows from the first port to the second port, or from the second port to the first port.

Further, the blocking-type surge protector having accelerated turn-off comprises:

a fourth transistor, wherein a source electrode of the fourth transistor is connected to the source electrode of the second transistor, a drain electrode of the fourth transistor is connected to the gate electrode of the first transistor, and a gate electrode of the fourth transistor is connected to the drain electrode of the second transistor;

a third resistor, connected between the gate electrode of the fourth transistor and the drain electrode of the fourth transistor;

the current of the blocking-type surge protector flows from the first port to the second port.

Further, the blocking-type surge protector having accelerated turn-off comprises:

a fourth transistor, wherein a source electrode of the fourth transistor is connected to a source electrode of the second transistor, a drain electrode of the fourth transistor is connected to the gate electrode of the first transistor, and a gate electrode of the fourth transistor is connected to the drain electrode of the second transistor;

a third resistor, connected between the gate electrode of the fourth transistor and the drain electrode of the fourth transistor;

a fifth transistor, wherein a gate electrode of the fifth transistor is connected to the source electrode of the second transistor, a source electrode of the fifth transistor is connected to the drain electrode of the second transistor, and a drain electrode of the fifth transistor is connected to the gate electrode of the third transistor;

a fourth resistor, connected between the drain electrode of the fifth transistor and the gate electrode of the fifth transistor.

Further, the accelerated turn-off module comprises:

a sixth transistor, wherein a gate electrode of the sixth transistor is connected to a source electrode of the sixth transistor, the source electrode of the sixth transistor is connected to the gate electrode of the second transistor, and a drain electrode of the sixth transistor is connected to the drain electrode of the first transistor;

the current of the blocking-type surge protector flows from the first port to the second port.

Further, the first transistor is a depletion-type NMOS transistor;

the second transistor is a P-type junction field-effect transistor;

the first resistor is usually a polysilicon resistor.

Further, the sixth transistor is an enhancement-type NMOS transistor.

Further, the fourth transistor is an enhancement-type NMOS transistor;

the third resistor is a polysilicon resistor.

The benefit effect of the invention is as follows.

A blocking-type surge protector for accelerated turn-off is provided. By means of introducing the accelerated turn-off module into a circuit, the turn-off speed of the blocking-type surge protector is greatly increased and a current flowing to an output end during the turn-off process is reduced, thereby providing finer and excellent surge protection for the post-stage load.

DETAILED DESCRIPTION

The following, in conjunction with the accompanying drawings of the embodiments of the invention, provides a clear and complete description of the technical solutions in the embodiments of the present invention. It is evident that the described embodiments are only a part of the embodiments of the invention, and not the entirety. Based on the embodiments of the present invention, all other embodiments that ordinary skilled persons in the art can obtain without exercising creative labor are within the scope of protection of the invention.

It should be noted that, unless conflicting, the features in the embodiments of the invention can be combined with each other.

The following, in conjunction with the accompanying drawings and specific embodiments, further illustrates the invention, but does not limit the scope of the invention.

Example 1

Figure 2:
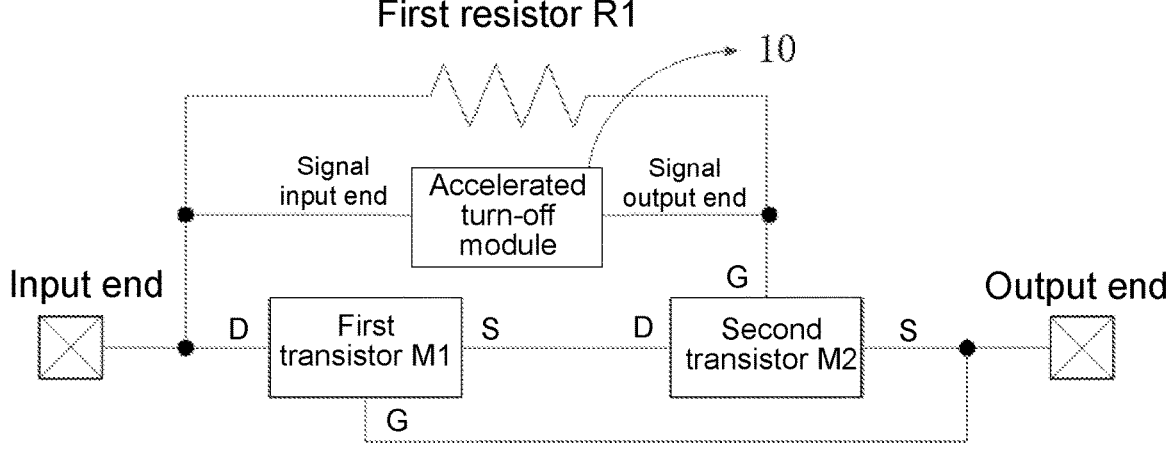
FIG. 2 shows the circuit structure of the blocking-type surge protector having accelerated turn-off of the invention.

Referring to FIG. 2, the invention provides a blocking-type surge protector having accelerated turn-off arranged between a first port and a second port, comprising:

a first transistor M1, where a drain electrode of the first transistor is connected to the first port, a second transistor M2, where a drain electrode of the second transistor M2 is connected to a source electrode of the first transistor M1, a source electrode of the second transistor M2 is connected to a gate electrode of the first transistor M1, and the source electrode of the second transistor M2 is connected to the second port;

a first resistor R1, wherein a first end of the first resistor R1 is connected to the drain electrode of the first transistor M1, and a second end of the first resistor R1 is connected to the gate electrode of the second transistor M2, i.e., the first resistor R1 is connected between the drain electrode of the first transistor M1 and the gate electrode of the second transistor M2;

an accelerated turn-off module 10, wherein a first end of the accelerated turn-off module 10 is connected to the drain electrode of the first transistor M1, and a second end of the accelerated turn-off module 10 is connected to the gate electrode of the second transistor M2, i.e., the accelerated turn-off module 10 is connected between the drain electrode of the first transistor M1 and the gate electrode of the second transistor M2.

The accelerated turn-off module 10 is used to increase the turn-off speed of the blocking surge protector.

Preferably, the first transistor M1 is a depletion-type NMOS transistor.

Preferably, the second transistor M2 is a P-type JFET, which is Junction Field-Effect Transistor (JFET).

Preferably, the first resistor R1 is usually a polysilicon resistor.

Figure 3:
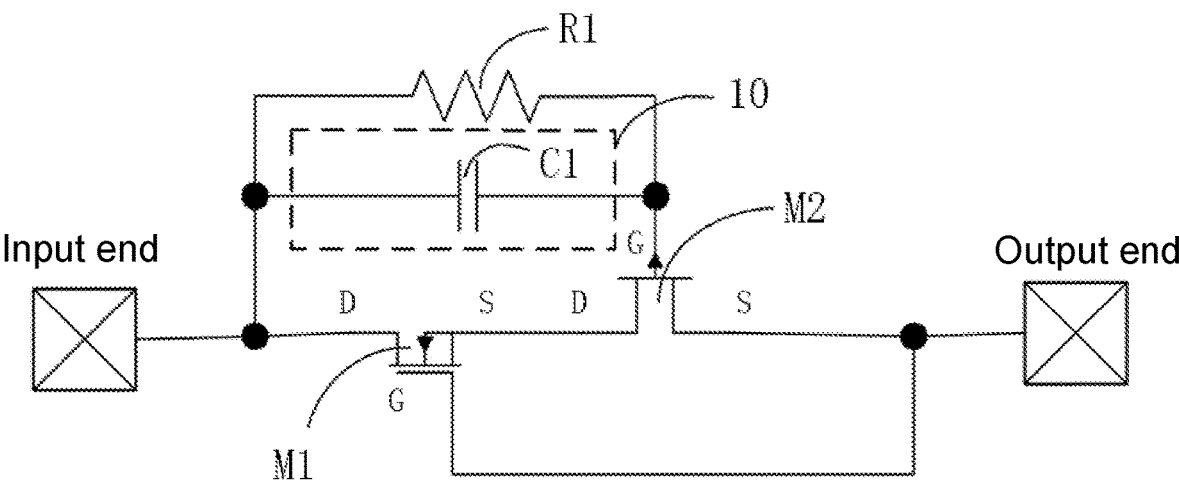
FIG. 3 shows the circuit diagram of an embodiment of the blocking-type surge protector having accelerated turn-off of the invention.

Referring to FIG. 3, as a preferred embodiment of the example, the accelerated turn-off module 10 comprises:

a capacitor C1, connected between the drain electrode of the first transistor M1 and the gate electrode of the second transistor M2.

The selection of the capacitance value of capacitor C1 is related to a parasitic capacitance of the gate electrode of the second transistor M2 and is generally in the range of tens of picofarads.

Figure 1:
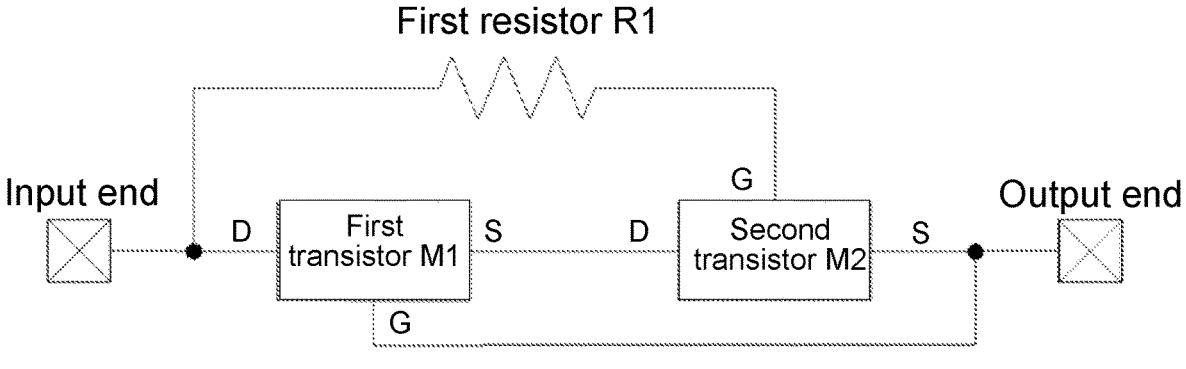
FIG. 1 shows the circuit structure of the blocking-type surge protector in the prior art.
Figure 4:
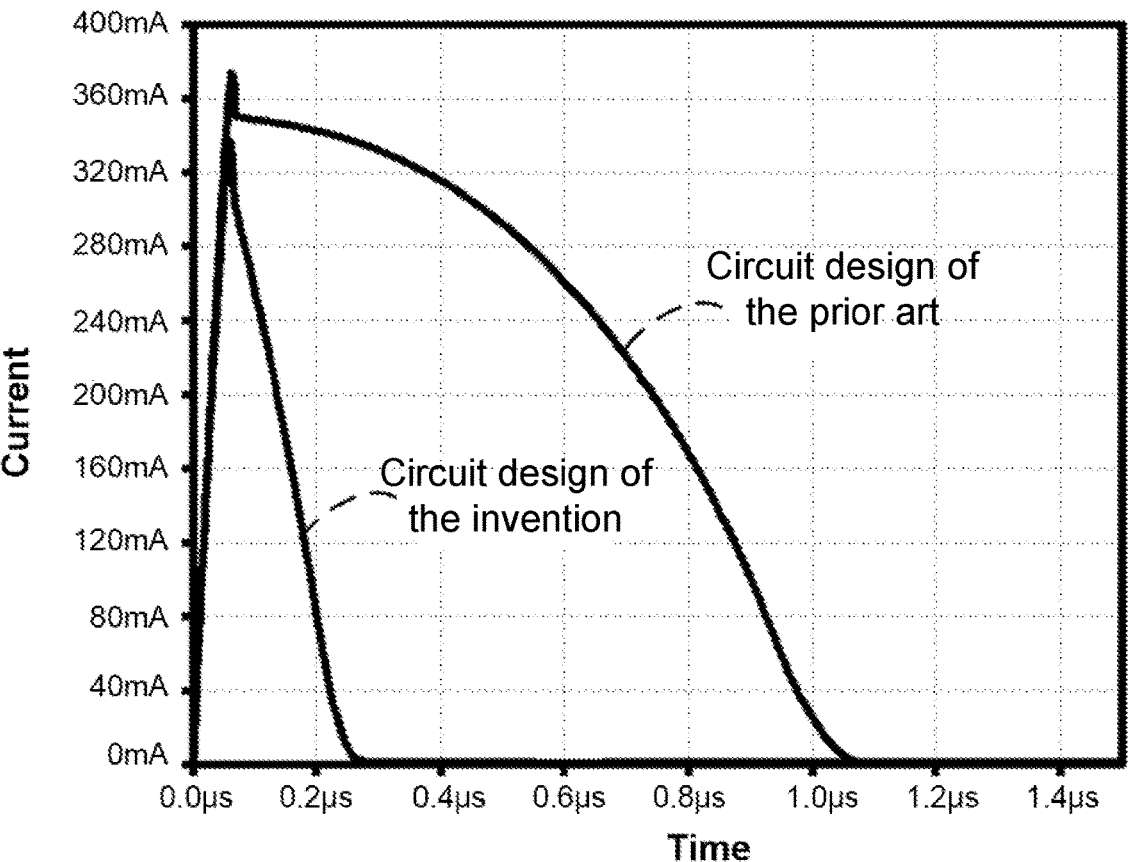
FIG. 4 shows the turn-off current waveform of the circuit design in the prior art and that of the circuit design of the invention.

Referring to FIG. 4, surge tests are conducted on the circuit design in the prior art in FIG. 1 and that of the invention in FIG. 3. The current waveform is shown in FIG. 4, in which the circuit design in the prior art takes approximately 1.1 us to achieve complete turn-off, while the circuit design of the invention achieves complete turn-off in 0.3 us.

Figure 5:
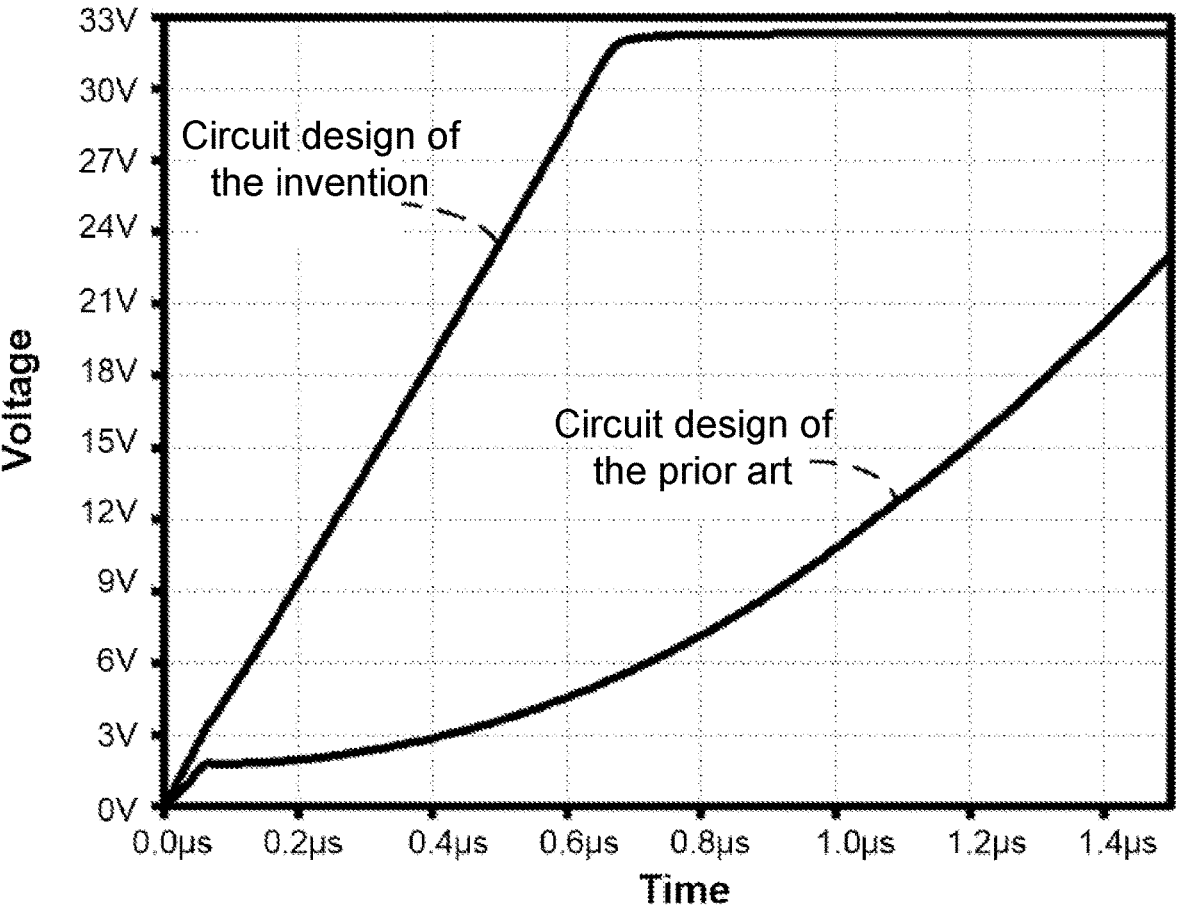
FIG. 5 shows the turn-off voltage waveform of the circuit design in the prior art and that of the circuit design of the invention.

Referring to FIG. 5, it shows the gate voltage waveform of the second transistor M2 (P-type JFET) for both the circuit design in the prior art in FIG. 1 and the circuit design of the invention in FIG. 3. The gate voltage rise rate of the circuit design of the invention is significantly faster than that of the traditional circuit. It can be seen that the accelerated turn-off module designed in the invention significantly increases the turn-off speed of the blocking-type surge protector.

The current of the blocking-type surge protector flows from the first port to the second port, that is, the first port is the input end and the second port is the output end.

Example 2

The main difference between the Example 2 and Example 1 is that the accelerated turn-off module 10 is a first diode D1.

Figure 6:
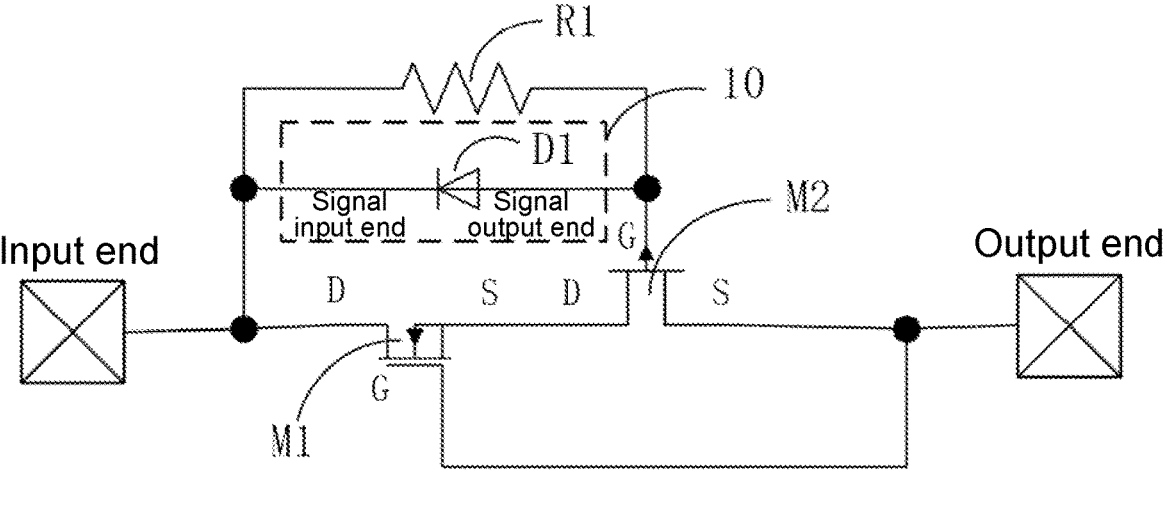
FIG. 6 shows the circuit diagram of another embodiment of the blocking-type surge protector having accelerated turn-off of the invention.

Referring to FIG. 6, the example provides a blocking-type surge protector having accelerated turn-off, comprising:

a first transistor M1, a drain electrode of the first transistor M1 is connected to a first port;

a second transistor M2, a drain electrode of the second transistor M2 is connected to a source electrode of the first transistor M1, a source electrode of the second transistor M2 is connected to a gate electrode of the first transistor M1, and the source electrode of the second transistor M2 is connected to a second port;

a first resistor R1, a first end of the first resistor R1 is connected to the drain electrode of the first transistor M1, and a second end of the first resistor R1 is connected to the gate electrode of the second transistor M2; that is, the first resistor R1 is connected between the drain electrode of the first transistor M1 and the gate electrode of the second transistor M2;

an accelerated turn-off module 10, a first end of the accelerated turn-off module 10 is connected to the drain electrode of the first transistor M1, and a second end of the accelerated turn-off module 10 is connected to the gate electrode of the second transistor M2; that is, the accelerated turn-off module 10 is connected between the drain electrode of the first transistor M1 and the gate electrode of the second transistor M2;

wherein the accelerated turn-off module 10 comprises:

a first diodes D1, a positive terminal of the first diodes D1 is connected to the gate electrode of the second transistor M2, and a negative terminal of the first diode D1 is connected to the drain electrode of the first transistor M1.

Preferably, the first transistor M1 is a depletion-type NMOS transistor.

Preferably, the second transistor M2 is a P-type JFET, which is Junction Field-Effect Transistor (JFET).

Preferably, the first resistor R1 is usually a polysilicon resistor.

In applications such as RS232 interfaces, RS485 interfaces, CANBUS, etc., blocking-type surge protectors face the risk of external lightning surge voltages reaching several hundred volts. This requires the accelerated turn-off module in the circuit design to withstand these high voltages to avoid module breakdown and circuit short-circuiting. In Example 1, the capacitor C1, which serves as the accelerated turn-off module, faces challenges in achieving the required voltage withstand capability of several hundred volts in common semiconductor manufacturing processes. This poses challenges in the manufacturing and packaging of blocking-type surge protectors capable of withstanding high voltages.

In this example, the accelerated turn-off module 10 is implemented by using diode D1. The positive terminal of diode D1 is connected to the second port (i.e., the gate electrode of the second transistor M2) of the signal, and the negative terminal of the diode D1 is connected to the first port (i.e., the drain electrode of the first transistor M1) of the signal. The voltage withstand capability and capacitance of the diode can be flexibly adjusted through semiconductor manufacturing processes, including but not limited to material resistivity, doping ion concentration, layout design, etc. This allows for a voltage withstand range from a few volts to several hundred volts and a capacitance range from a few picofarads to several hundred picofarads, greatly expanding the selection range for circuit design and enabling the circuit in Example 2 to withstand lightning surges of several hundred volts, thereby broadening the circuit's application range.

The current of the blocking-type surge protector flows from the first port to the second port, that is, the first port is the input end and the second port is the output end.

Example 3

This example is a development based on Example 2, in which the example is a bidirectional blocking-type surge protector having an accelerated turn-off module. The main difference is that between the second transistor M2 and the second port, a third transistor M3 is also connected, and a second resistor R2 is added.

Figure 7:
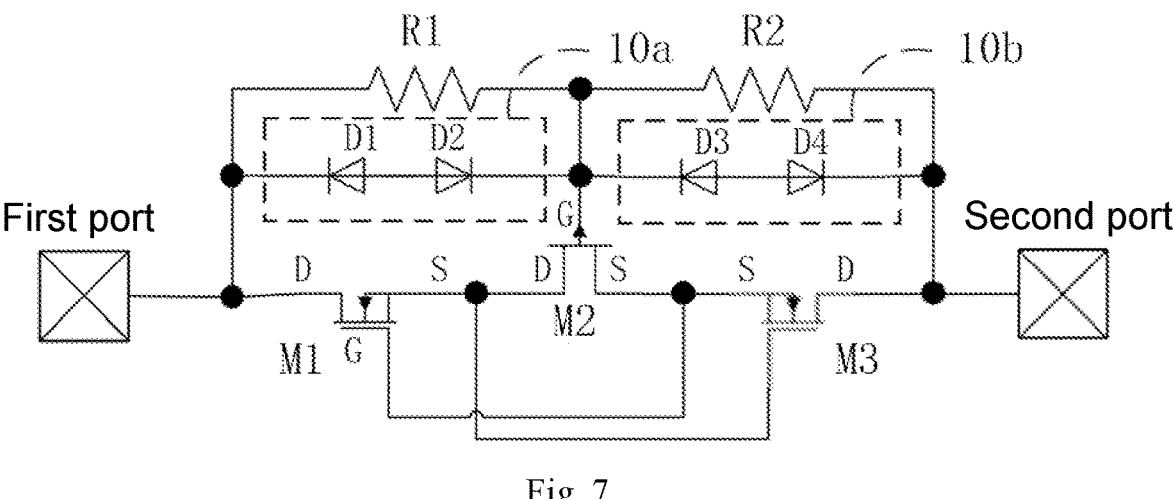
FIG. 7 shows the circuit diagram of another embodiment of the blocking-type surge protector having accelerated turn-off of the invention.

Referring to FIG. 7, this example provides a bidirectional blocking-type surge protector having accelerated turn-off, comprising:

a first transistor M1, a drain electrode of the first transistor M1 is connected to the first port;

a second transistor M2, a drain electrode of the second transistor M2 is connected to a source electrode of the first transistor M1, and a source electrode of the second transistor M2 is connected to a gate electrode of the first transistor M1;

the first resistor R1, a first end of the first resistor R1 is connected to the drain electrode of the first transistor M1, and a second end of the first resistor R1 is connected to a gate electrode of the second transistor M2, i.e., the first resistor R1 is connected between the drain electrode of the first transistor M1 and the gate electrode of the second transistor M2;

the accelerated turn-off module 10 includes a first accelerated turn-off unit 10a and a second accelerated turn-off unit 10b;

the first accelerated turn-off unit 10a, a first end of the first accelerated turn-off unit 10a is connected to the drain electrode of the first transistor M1, and a second end of the first accelerated turn-off unit 10a is connected to the gate electrode of the second transistor M2, i.e., the first accelerated turn-off unit 10a is connected between the drain electrode of the first transistor M1 and the gate electrode of the second transistor M2;

a third transistor M3, with a source electrode of the third transistor M3 is connected to the source electrode of the second transistor M2, a gate electrode of the third transistor M3 is connected to the source electrode of the first transistor M1, and a drain electrode of the third transistor M3 is connected to the second port;

a second resistor R2, a first end of the second resistor R2 is connected to the gate electrode of the second transistor M2, and a second end of the second resistor R2 is connected to the drain electrode of the third transistor M3, i.e., the second resistor R2 is connected between the gate electrode of the second transistor M2 and the drain electrode of the third transistor M3;

the second accelerated turn-off unit 10b, a first end of the second accelerated turn-off unit 10b is connected to the gate electrode of the second transistor M2, and a second end of the second accelerated turn-off unit 10b is connected to the drain electrode of the third transistor M3, i.e., the second accelerated turn-off unit 10b is connected between the gate electrode of the second transistor M2 and the drain electrode of the third transistor M3;

the first accelerated turn-off unit 10a includes:

a first diode D1, a negative terminal of the first diode D1 is connected to the drain electrode of the first transistor M1;

a second diode D2, a positive terminal of the second diode D2 is connected to a positive terminal of the first diode D1, and a negative terminal of the second diode D2 is connected to the gate electrode of the second transistor M2;

the second accelerated turn-off unit 10b includes:

a third diode D3, a negative terminal of the third diode D3 is connected to the gate electrode of the second transistor M2;

a fourth diode D4, a positive terminal of the fourth diode D4 is connected to a positive terminal of the third diode D3, and a negative terminal of the fourth diode D4 is connected to the drain electrode of the third transistor M3.

In this embodiment, the current of the surge protector flows from the first port to the second port, or from the second port to the first port. The two-directional accelerated turn-off units 10a and 10b are symmetrical and each consists of two diodes with opposite directions. The inclusion of diodes D2 and D3 is to prevent the short-circuiting of the second transistor M2 by the forward diodes D1 and D4 when the gate voltage of the second transistor M2 rises, ensuring that the circuit can be properly turned off.

Preferably, the first transistor M1 and the third transistor M3 are depletion-type NMOS transistors.

Preferably, the second transistor M2 is a P-type JFET, which is Junction Field-Effect Transistor (JFET).

Preferably, the first resistor R1 and the second resistor R2 are polysilicon resistors.

Example 4

Figure 8:
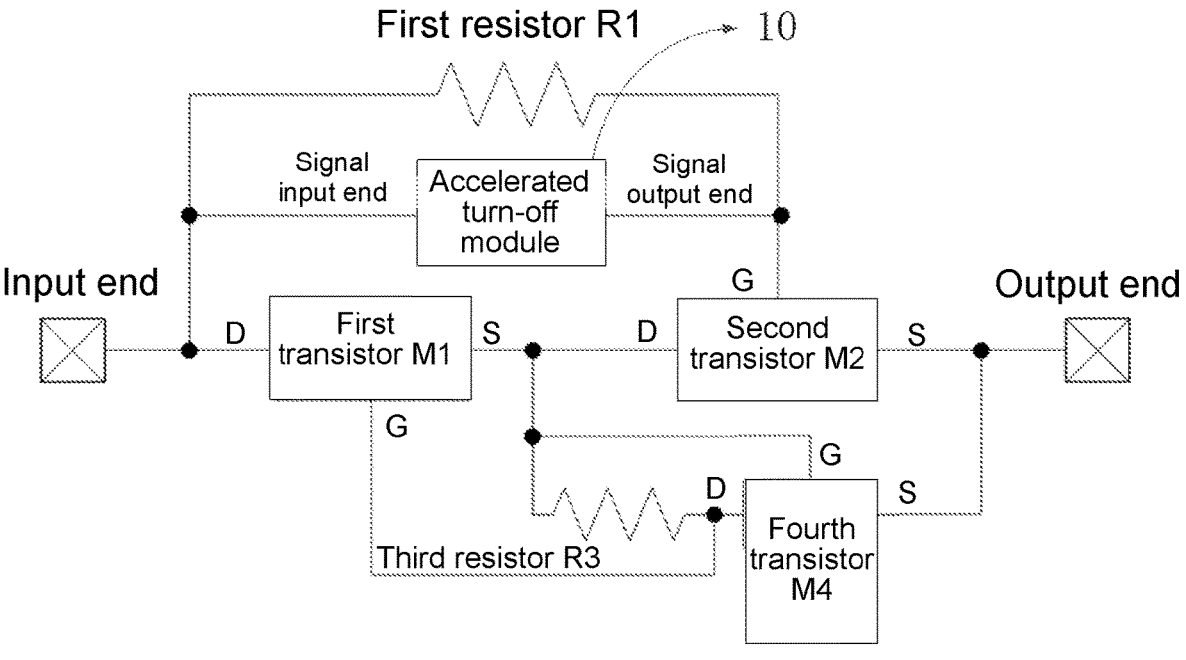
FIG. 8 shows the circuit diagram of another embodiment of the blocking-type surge protector having accelerated turn-off of the invention.

FIG. 8 shows a circuit structure of a trigger current concentrator blocking-type surge protector having accelerated turn-off according to the invention. The circuit includes a fourth transistor M4 and a third resistor R3, wherein the fourth transistor M4 is an enhancement-type NMOS transistor, and the third resistor R3 is usually a polysilicon resistor. The fourth transistor M4 is connected between the gate electrode of the first transistor M1 and the source electrode of the second transistor M2.

Referring to FIG. 8, this example provides a trigger current concentrator blocking-type surge protector having accelerated turn-off, comprising:

a first transistor M1, a drain electrode of the first transistor M1 is connected to a first port;

a second transistor M2, a drain electrode of the second transistor M2 is connected to the source electrode of the first transistor M1, and a source electrode of the second transistor M2 is connected to a second port;

a first resistor R1, a first end of the first resistor R1 is connected to the drain electrode of the first transistor M1, and a second end of the first resistor R1 is connected to the gate electrode of the second transistor M2; that is, the first resistor R1 is connected between the drain electrode of the first transistor M1 and the gate electrode of the second transistor M2;

an accelerated turn-off module 10, a first end of the accelerated turn-off module 10 is connected to the drain electrode of the first transistor M1, and the second end of the accelerated turn-off module 10 is connected to the gate electrode of the second transistor M2, i.e., the accelerated turn-off module 10 is connected between the drain electrode of the first transistor M1 and the gate electrode of the second transistor M2;

a fourth transistor M4, a source electrode of the fourth transistor M4 is connected to a source electrode of the second transistor M2, a drain electrode of the fourth transistor M4 is connected to the gate electrode of the first transistor M1, and the gate electrode of the fourth transistor M4 is connected to the drain electrode of the second transistor M2;

a third resistor R3, a first end of the third resistor R3 is connected to the gate electrode of the fourth transistor M4, and a second end of the third resistor R3 is connected to the drain electrode of the fourth transistor M4, i.e., the third resistor R3 is connected between the gate electrode of the second transistor M2 and the drain electrode of the three transistor M3.

Preferably, the first transistor M1 is a depletion-type NMOS transistor.

Preferably, the second transistor M2 is a P-type JFET, which is Junction Field-Effect Transistor (JFET).

Preferably, the first resistor R1 is usually a polysilicon resistor.

Preferably, the fourth transistor M4 is an enhancement-type NMOS transistor.

Preferably, the third resistor R3 is usually a polysilicon resistor.

Figure 9:
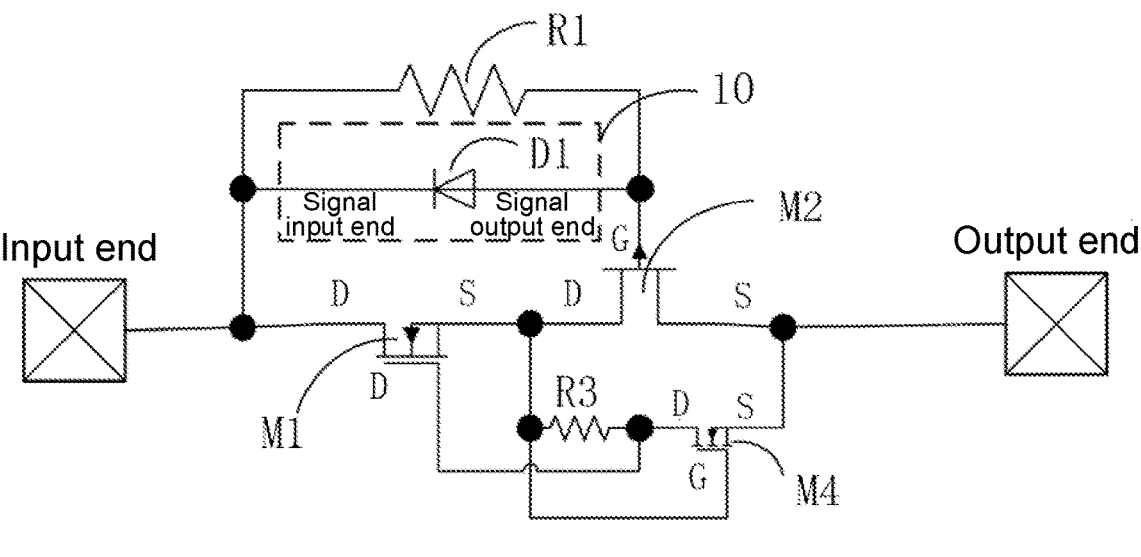
FIG. 9 shows the circuit diagram of another embodiment of the blocking-type surge protector having accelerated turn-off of the invention.

Referring to FIG. 9, as a preferred embodiment of this example, the accelerated turn-off module 10 includes a first diode D1, a positive terminal is of the first transistor M1 is connected to the gate electrode of the second transistor M2, and a negative terminal first diode D1 is connected to the drain electrode of the first transistor M1.

In the circuit, the fourth transistor M4 and the third resistor R3 are present in the circuit of the gate electrode of the first transistor M1. During the semiconductor manufacturing process, normal process variations can cause the threshold voltage of the first transistor M1 to vary within a certain range. This leads to significant fluctuations in the triggering turn-off current of the whole circuit of the blocking-type surge protector, which is not conducive to stable and consistent product performance. However, the fourth transistor M4 in the circuit effectively solves the aforementioned problem. This is because the threshold voltage fluctuations of the enhancement-type NMOS transistor can be precisely controlled during the manufacturing process, thereby keeping the variation of the threshold voltage within a small range. When there is a lightning surge at the first port, the voltage generated across the two ends of the current flowing through the second transistor M2 reaches the threshold voltage of the fourth transistor M4. Only when M4 is turned on, the whole circuit starts to turn off, thus avoiding the problem of inconsistent triggering turn-off current caused by fluctuations in the threshold voltage of the first transistor M1.

The added accelerated turn-off module in this invention allows for a rapid increase in the voltage at the gate electrode of the second transistor M2, thereby causing the voltage across the two ends of the second transistor M2 to rise quickly to reach the threshold voltage of the fourth transistor M4 as soon as possible. This leads to the rapid activation of the fourth transistor M4, effectively accelerating the whole circuit turn-off process. The threshold voltage of the fourth transistor M4 varies depending on the conduction resistance of the second transistor M2 and the trigger turn-off current, typically around 1V. The third resistor R3 is included to prevent a short circuit of the second transistor M2 when the fourth transistor M4 is activated, with a resistance value typically several hundred kΩs.

The current of the blocking-type surge protector flows from the first port to the second port. The first port serves as the current input end, while the second port serves as the current output end.

Example 5

Figure 10:
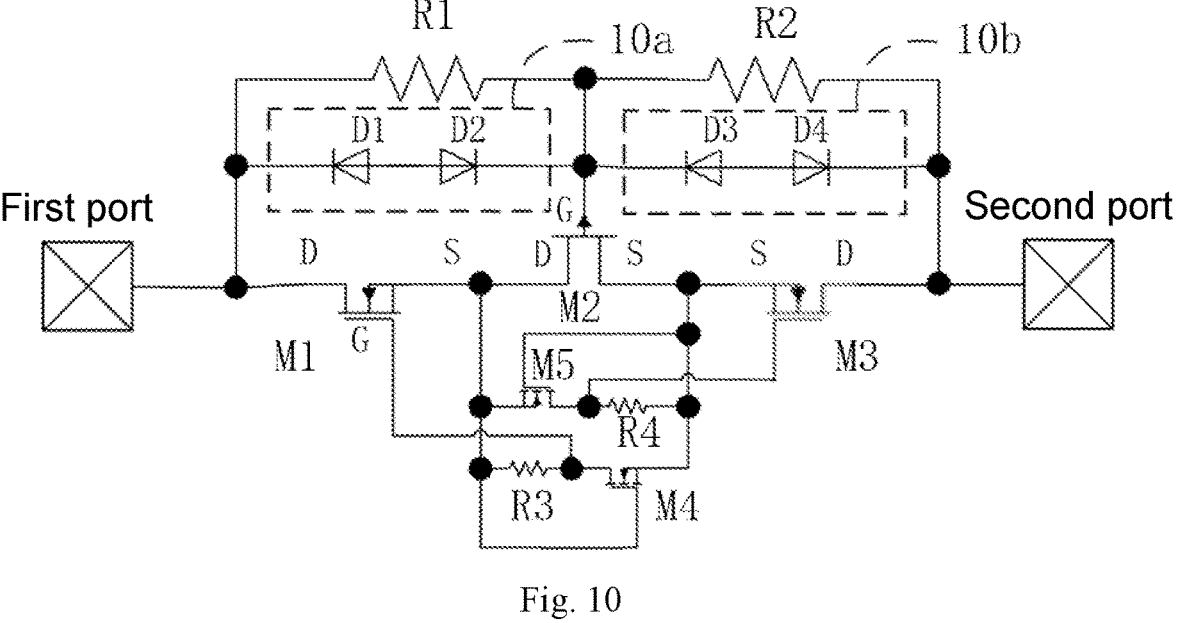
FIG. 10 shows the circuit diagram of another embodiment of the blocking-type surge protector having accelerated turn-off of the invention.

This example is developed based on Example 4 and features a bidirectional blocking-type surge protection circuit having an accelerated turn-off. The main difference lies in a fourth transistor M4 is further connected between the gate electrode of the first transistor M1 and the source electrode of the second transistor M2. A third resistor R3 is connected between the gate electrode and drain electrode of the fourth transistor M4. Additionally, a fifth transistor M5 is connected between the gate electrode of the third transistor M3 and the drain electrode of the second transistor M2, a fourth resistor R4 is connected between the gate electrode and drain electrode of the fifth transistor M5. Referring to FIG. 10, this example provides a bidirectional blocking-type surge protector having accelerated turn-off, comprising:

a first transistor M1, a drain electrode of the first transistor M1 is connected to the first port;
a second transistor M2, a drain electrode of the second transistor M2 is connected to the source electrode of the first transistor M1, a source electrode of the second transistor M2 is connected to the gate electrode of the first transistor M1, and the source electrode of the second transistor M2 is connected to the second port;
a first resistor R1, a first end of the first resistor R1 is connected to the drain electrode of the first transistor M1, and a second end of the first transistor M1 is connected to the gate electrode of the second transistor M2; that is, the first resistor R1 is connected between the drain electrode of the first transistor M1 and the gate electrode of the second transistor M2;
a third transistor M3, a source electrode of the third transistor M3 is connected to the source electrode of the second transistor M2, the gate electrode of the third transistor M3 is connected to the source electrode of the first transistor M1, and the drain electrode of the third transistor M3 is connected to the second port;
a second resistor R2, a first end of the second resistor R2 is connected to the gate electrode of the second transistor M2, and a second end of the second resistor R2 is connected to the drain electrode of the third transistor M3; that is, the second resistor R2 is connected between the gate electrode of the second transistor M2 and the drain electrode of the third transistor M3;
the accelerated turn-off module 10 includes a first accelerated turn-off unit 10a and a second accelerated turn-off unit 10b;
wherein the first accelerated turn-off unit 10a includes:
a first diode D1, a negative terminal of the first diode D1 is connected to the drain electrode of the first transistor M1;
a second diode D2, a positive terminal of the second diode D2 is connected to a positive terminal of the first diode D1, and a negative terminal of the second diode D2 is connected to the gate electrode of the second transistor M2;
wherein the second accelerated turn-off unit 10b includes:
a third diode D3, a negative terminal of the third diode D3 is connected to the gate electrode of the second transistor M2;
a fourth diode D4, a positive terminal of the fourth diode D4 is connected to a positive terminal of the third diode D3, and a negative terminal of the fourth diode D4 connected to the drain electrode of the third transistor M3;
a fourth transistor M4, a source electrode of the fourth transistor M4 is connected to the source electrode of the second transistor M2, the drain electrode of the fourth transistor M4 is connected to the gate electrode of the first transistor M1, and the gate electrode of the fourth transistor M4 is connected to the drain electrode of the second transistor M2;
a fifth transistor M5, a gate electrode of the fifth transistor M5 is connected to the source electrode of the second transistor M2, a source electrode of the fifth transistor M5 is connected to the drain electrode of the second transistor M2, and a drain electrode of the fifth transistor M5 is connected to the gate electrode of the third transistor M3;
a third resistor R3, a first end of the third resistor R3 is connected to the gate electrode of the fourth transistor M4, and a second end of the third resistor R3 is connected to the drain electrode of the fourth transistor M4;
a fourth resistor R4, a first end of the fourth resistor R4 is connected to the drain electrode of the fifth transistor M5, and the second end of the fourth resistor R4 is connected to the gate electrode of the fifth transistor M5; that is, the fourth resistor R4 is connected between the drain electrode of the fifth transistor M5 and the gate electrode of the fifth transistor M5.

In this example, the enhancement-type NMOS transistor M4 and resistor R3 connected to the gate circuit of the first transistor M1 are used to solve the problem of inconsistent trigger turn-off current values from the first port to the second port caused by fluctuations in the M1 threshold voltage. The first accelerated turn-off unit 10a is used to accelerate the turn-off speed when lightning surges occur in the direction from the first port to the second port. The enhancement-type NMOS transistor M5 and resistor R4 connected to the gate circuit of the third transistor M3 are used to solve the problem of inconsistent trigger turn-off current values from the second port to the first port caused by fluctuations in the M3 threshold voltage. The second accelerated turn-off unit 10b is used to accelerate the turn-off speed when lightning surges occur in the direction from the second port to the first port.

Preferably, the first transistor M1 and the third transistor M3 are depletion-type NMOS transistors.

Preferably, the second transistor M2 is a P-type JFET, which is Junction Field-Effect Transistor (JFET).

Preferably, the first resistor R1 and the second resistor R2 is polysilicon resistors.

Preferably, the fourth transistor M4 and the fifth transistor M5 are enhancement-type NMOS transistors.

Example 6

The main difference between this example and Example 1 is that the accelerated turn-off module 10 is a sixth transistor M6.

Figure 11:
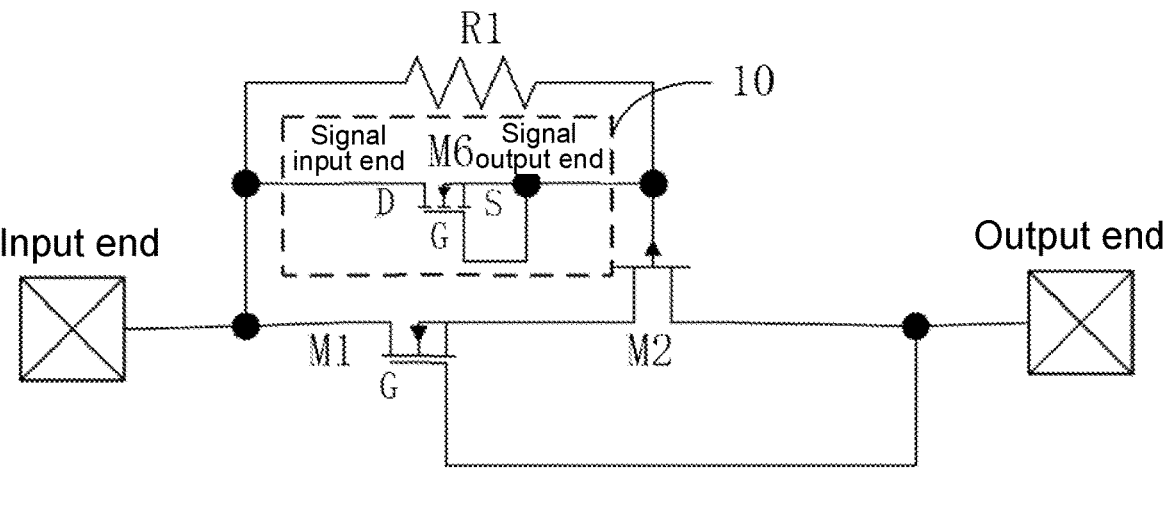
FIG. 11 shows the circuit diagram of another embodiment of the blocking-type surge protector having accelerated turn-off of the invention.

Referring to FIG. 11, this example provides a blocking-type surge protector having accelerated turn-off, comprising:

a first transistor M1, a drain electrode of the first transistor is connected to the first port;

a second transistor M2, a drain electrode of the second transistor M2 is connected to a source electrode of the first transistor M1, a source electrode of the second transistor M2 is connected to a gate electrode of the first transistor M1, and the source electrode of the second transistor M2 is connected to the second port;

a first resistor R1, a first end of the first resistor R1 is connected to the drain electrode of the first transistor M1, and a second end of the first resistor R1 is connected to the gate electrode of the second transistor M2; that is, the first resistor R1 is connected between the drain electrode of the first transistor M1 and the gate electrode of the second transistor M2;

an accelerated turn-off module 10, a first port of the accelerated turn-off module 10 connected to the drain electrode of the first transistor M1, and the second port of the accelerated turn-off module 10 is connected to the gate electrode of the second transistor M2; the accelerated turn-off module 10 is connected between the drain electrode of the first transistor M1 and the gate electrode of the second transistor M2;

wherein, the accelerated turn-off module 10 includes: a sixth transistor M6, a gate electrode of the sixth transistor M6 is connected to the source electrode of the sixth transistor M6, a source electrode of the sixth transistor M6 is connected to the gate electrode of the second transistor M2, and the drain electrode of the sixth transistor M6 is connected to the drain electrode of the first transistor M1.

The current of the blocking-type surge protector flows from the first port to the second port. The first port serves as the current input end, while the second port serves as the current output end.

Preferably, the first transistor M1 is a depletion-type NMOS transistor.

Preferably, the second transistor M2 is a P-type JFET, which is Junction Field-Effect Transistor (JFET).

Preferably, the first resistor R1 is usually a polysilicon resistor.

Preferably, the sixth transistor M6 is an enhancement-type NMOS transistor.

The above is merely a preferred embodiment of the invention, and should not be construed as limiting the implementation and scope of the invention. Those skilled in the art should be aware that any equivalent substitutions and obvious modifications made based on the disclosure and illustrations in this specification are included within the scope of the invention.

What is claimed is:

1. A blocking-type surge protector having accelerated turn-off arranged between a first port and a second port, comprising:

a first transistor, a drain electrode of the first transistor is connected to the first port;

a second transistor, a drain electrode of the second transistor is connected to a source electrode of the first transistor, a source electrode of the second transistor is connected to a gate electrode of the first transistor, and the source electrode of the second transistor is connected to the second port;

a first resistor, connected between the drain electrode of the first transistor and a gate electrode of the second transistor;

an accelerated turn-off module, connected between the drain electrode of the first transistor and the gate electrode of the second transistor;

wherein when a surge occurs, a current flowing through the accelerated turn-off module charges a parasitic capacitance of the gate electrode of the second transistor, such that a gate voltage of the second transistor quickly rises, so as to increase turn-off speed of blocking-type surge protector;

a third transistor, wherein a source electrode of the third transistor is connected to the source electrode of the second transistor, a gate electrode of the third transistor is connected to the source electrode of the first transistor, and a drain electrode of the third transistor is connected to the second port; and a second resistor, connected between the gate electrode of the second transistor and the drain electrode of the third transistor;

wherein the accelerated turn-off module comprises a first accelerated turn-off unit and a second accelerated turn-off unit;

the first accelerated turn-off unit comprises:

a first diode, wherein a negative terminal of the first diode is connected to the drain electrode of the first transistor; and a second diode, wherein a positive terminal of the second diode is connected to a positive terminal of the first diode, and a negative terminal of the second diode is connected to the gate electrode of the second transistor;

the second accelerated turn-off unit comprises:

a third diode, wherein a negative terminal of the third diode is connected to the gate electrode of the second transistor; and a fourth diode, wherein a positive terminal of the fourth diode is connected to a positive terminal of the third diode, and a negative terminal of the fourth diode is connected to the drain electrode of the third transistor; wherein the current of the blocking-type surge protector flows from the first port to the second port, or from the second port to the first port.

2. The blocking-type surge protector having accelerated turn-off of claim 1, wherein the accelerated turn-off module comprises:

a capacitor, connected between the drain electrode of the first transistor and the gate electrode of the second transistor;

wherein the current of the blocking-type surge protector flows from the first port to the second port.

3. The blocking-type surge protector having accelerated turn-off of claim 1, wherein the accelerated turn-off module comprises:

a first diode, wherein a positive terminal of the first diode is connected to the gate electrode of the second transistor, and a negative terminal of the first diode is connected to the drain electrode of the first transistor;

wherein the current of the blocking-type surge protector flows from the first port to the second port.

4. The blocking-type surge protector having accelerated turn-off of claim 1 or 3, further comprising:

a fourth transistor, wherein a source electrode of the fourth transistor is connected to the source electrode of the second transistor, a drain electrode of the fourth transistor is connected to the gate electrode of the first transistor, and a gate electrode of the fourth transistor is connected to the drain electrode of the second transistor;

a third resistor, connected between the gate electrode of the fourth transistor and the drain electrode of the fourth transistor;

the current of the blocking-type surge protector flows from the first port to the second port.

5. The blocking-type surge protector having accelerated turn-off of claim 1, further comprising:

a fourth transistor, wherein a source electrode of the fourth transistor is connected to a source electrode of the second transistor, a drain electrode of the fourth transistor is connected to the gate electrode of the first transistor, and a gate electrode of the fourth transistor is connected to the drain electrode of the second transistor;

a third resistor, connected between the gate electrode of the fourth transistor and the drain electrode of the fourth transistor;

a fifth transistor, wherein a gate electrode of the fifth transistor is connected to the source electrode of the second transistor, a source electrode of the fifth transistor is connected to the drain electrode of the second transistor, and a drain electrode of the fifth transistor is connected to the gate electrode of the third transistor;

a fourth resistor, connected between the drain electrode of the fifth transistor and the gate electrode of the fifth transistor.

6. The blocking-type surge protector having accelerated turn-off of claim 1, wherein the accelerated turn-off module comprises:

a sixth transistor, wherein a gate electrode of the sixth transistor is connected to a source electrode of the sixth transistor, the source electrode of the sixth transistor is connected to the gate electrode of the second transistor, and a drain electrode of the sixth transistor is connected to the drain electrode of the first transistor;

the current of the blocking-type surge protector flows from the first port to the second port.

7. The blocking-type surge protector having accelerated turn-off of claim 1, wherein the first transistor is a depletion-type NMOS transistor;

the second transistor is a P-type junction field-effect transistor;

the first resistor is a polysilicon resistor.

8. The blocking-type surge protector having accelerated turn-off of claim 6, wherein the sixth transistor is an enhancement-type NMOS transistor.

9. The blocking-type surge protector having accelerated turn-off of claim 4, wherein the fourth transistor is an enhancement-type NMOS transistor;

the third resistor is a polysilicon resistor.

* * * * *